Patented Aug. 1, 1950

2,517,383

UNITED STATES PATENT OFFICE 2,517,383

PROCESS FOR THE PRODUCTION OF 5-CARBON ACYCLIC ALDEHYDES

Richard Ensign Brooks, Wilmington, Del., assignor to E. I. du Pont de Nemours & Company, Wilmington, Del., a corporation of Delaware No Drawing. Application November 13, 1947, Serial No. 785,799

2 Claims. (Cl. 260—604)

This invention relates to a process for the preparation of saturated aliphatic aldehydes. More particularly, it relates to a new and improved process for the manufacture of 5-carbon saturated acyclic monoaldehydes from butadiene.

The reaction of butadiene with carbon monoxide and hydrogen in the presence of a hydrogenation catalyst in which reaction all of the reactants are first mixed together below the temperature at which aldehyde formation occurs and subsequently heated to reaction temperature has been shown to give reaction products consisting predominantly of nondistillable, polymeric materials and derivatives of the butadiene dimer, vinylcyclohexene.

This invention has as an object the provision of a process for the preparation of saturated acyclic 5-carbon aldehydes. A further object is the elimination to a large degree of the production of high boiling and polymeric products in the reaction of butadiene with carbon monoxide and hydrogen. Other objects will appear hereinafter.

These objects are accomplished by the following invention wherein butadiene is injected into a mixture, maintained at a temperature of 75–200° C., of from one to nine molar equivalents of carbon monoxide with three molar equivalents of hydrogen under a total pressure of at least 300 and preferably 500–1500 atmospheres, in the presence of a hydrogenation catalyst, the butadiene being injected at such a rate that the molar ratio of butadiene to unreacted hydrogen does not exceed 1:2.

The following examples are illustrative of the invention.

Example I

A silver-lined pressure vessel of 400 cc. capacity was charged with 100 grams of acetic anhydride and 10 grams of cobalt catalyst prepared by the reduction of the oxide. The vessel was pressured with 200 atmospheres of hydrogen and the total pressure was then raised to 600 atmospheres with carbon monoxide. The vessel was heated to 130° C., with agitation, and 29 grams of butadiene was injected during one hour. After cooling, the tube was opened and the product was discharged. Distillation of the reaction product (150 g.) gave 27 grams of a fraction boiling at 44–48° C./132 mm. It was identified as a mixture of about 95% n-valeraldehyde and 5% methylethylacetaldehyde. Based on the butadiene charged, this represents a 60% yield of 5-carbon saturated monoaldehydes.

Example II

A silver-lined pressure vessel of 400 cc. capacity was charged with 1.54 grams of the organo-cobalt compound (butadiene-cobalt carbonyl complex) obtained by reaction of an isopropanol solution of cobalt carbonyl [$Co_2(CO)_8$] with butadiene at 130° C. under 100 atmospheres pressure as disclosed in the copending application Serial Number 779,837, filed October 14, 1947, by W. W. Prichard. The vessel was then closed, pressured to 200 atmospheres with hydrogen, then to 600 atmospheres with carbon monoxide and heated to 135° C. with agitation. Butadiene, 48 grams, was then injected into the reaction vessel during 1.25 hours; the tube was then cooled and its contents discharged. The discharged product amounted to 64 grams and was found to consist of 14 grams of recovered butadiene, 30 grams of material boiling from 50–60° C./150 mm., 8 grams boiling from 30° C./14 mm. to 92° C./1 mm., and 12 grams of residue. The lower-boiling fraction was shown by fractionation and preparation of suitable derivatives to consist of approximately equal parts of n-valeraldehyde and methylethylacetaldehyde, and represents a 55% yield of 5-carbon saturated monoaldehydes based on the butadiene consumed.

Example III

A silver-lined vessel of 400 cc. capacity was charged with 5 grams of coarse calcium turnings and 100 cc. of diethyl ether, closed, and pressured first to 200 atmospheres with hydrogen and then to 400 atmospheres with carbon monoxide. The tube was then heated to 190° C. and, while agitating, 17 grams of butadiene was injected during the course of 30 minutes. The reactor was cooled, opened, and the product was discharged and distilled. After removal of the ether, 13 grams distilled at 51–61° C./200 mm. and 4 grams at 50–100° C./30 mm. Two grams of residue was left in the still. The lower-boiling fraction was identified as a mixture of methylethylacetaldehyde and n-valeraldehyde. This represents a 48% yield of 5-carbon saturated monoaldehydes.

Example IV

Into a silver-lined shaker tube having a capacity of 325 cc. was placed a cyclohexane solution of cobalt carbonyl, prepared by subjecting an agitated suspension of 10 grams of finely divided (8 to 14 mesh) reduced cobalt oxide in 128 cc. of cyclohexane containing 1 gram of hydroquinone to the action of carbon monoxide at 150° C. under 700 atmospheres pressure for one hour. Hydrogen was then injected into the shaker tube until the pressure reached 300 atmospheres, after which carbon monoxide was introduced until the pressure reached 450 atmospheres. The resulting mixture, in which the CO : $H_2$ mol ratio was about 1:2, was heated to a temperature of 110° C. with the shaker tube inlet valve closed. This caused the pressure to increase to 495 atmospheres. The valve was then opened and a mixture of 14 grams of butadiene and 42 milliliters of cyclohexane was injected from a charging tube. This was done by imposing 680 atmospheres of carbon monoxide-hydrogen pressure on the charging tube. After six to eight minutes the injection was stopped by equalizing the pressure within the shaker tube with the pressure within the charging tube. The heating was continued at 650 to 720 atmospheres pressure (temperature, 110° C. to 119° C.) for 52 minutes more, after which the product was discharged. During the reaction period the mol ratio of butadiene: unreacted hydrogen did not exceed about 1:8. The discharged product was extracted with dilute sulfuric acid, and the cyclohexane layer was separated, combined with cyclohexane washes of the water extract, and distilled. After removal of the cyclohexane fraction, the chief reaction product was collected, namely the $C_5$ monoaldehyde fraction which had a boiling point of 40° C./170 to 177 mm. The distillation heel (1.5 grams) also contained aldehyde, as shown by reaction with 2,4-dinitrophenylhydrazine.

*Example V*

Into a silver-lined shaker tube having a capacity of 325 cc. was placed 75 cc. of diethyl ether and 20 grams of reduced, fused, cobalt oxide catalyst. Hydrogen was then introduced into the shaker tube until the pressure reached 150 atmospheres, after which carbon monoxide was introduced until the pressure reached 295 atmospheres. After the introduction of hydrogen and carbon monoxide the shaker tube was closed and was heated to a temperature of 140° C., which caused the pressure to increase to 375 atmospheres. Butadiene was then introduced portionwise into the shaker tube over a period of about 42 minutes. The total weight of butadiene injected during this time was 44 grams. The temperature was maintained within the range of 142° to 152°, and the pressure was held at 400 to 700 atmospheres, during the injection of the butadiene. Heating of the mixture was continued for an additional 78 minutes, after which the reaction product was withdrawn from the shaker tube. Ether was separated from the resulting mixture by distillation, and the residue which remained after vaporization of the ether was distilled at diminished pressure. The distillate was fractionated by means of a Vigreaux column at atmospheric pressure. The volume of distillate when the temperature reached 93° was 15 cc. Over the range 93° to 121° C., the volume of distillate collected was 22 cc. The distillation residue weighed only 2.8 grams. The main fraction gave a positive test for the carbonyl group, and evidently was a crude mixture containing $C_5$ aldehydes (B. P. of $CH_3(CH_2)_3CHO$, 103° C.).

Other experiments were carried out using the general procedures of the foregoing examples, that is, injection of butadiene into a mixture of carbon monoxide, hydrogen, and a cobalt catalyst at 120–150° C. in various diluents such as acetic acid, water, diethyl ether, dioxane, tertiary butanol, and cyclohexane. In each case, mixtures of n-valeraldehyde and methylethylacetaldehyde were obtained and, furthermore, the amount of non-distillable residue was, in every case, much less than that obtained when initially charging the vessel with butadiene, carbon monoxide, hydrogen, and cobalt catalyst and subsequently heating to reaction temperature.

In general, total pressures of 300–1500 atmospheres or higher can be employed in the process of this invention. It is preferred to use total pressures within the range of 500–1500 atmospheres since these usually give optimum results. These total pressures of carbon monoxide and hydrogen are critical, since it has been found that if they fall below about 300 atmospheres, increasing amounts of di-n-butyl ketone and non-distillable residue are obtained, until at 100 atmospheres the reaction product consists of 60% non-distillable polymers from which no pure compound could be isolated, 30% di-n-butyl ketone, and 10% 5-carbon monoaldehydes.

The temperatures employed in the process of this invention include those within the range of 75–200° C. The reaction temperature chosen will depend on the particular catalyst employed; for example, with active cobalt catalysts, temperatures as low as 75° C. are suitable, preferably 100–150° C., while with metallic calcium or magnesium catalysts temperatures of 190–200° C. are usually required for preferred results. As previously pointed out, it is important that the mixture of catalyst, carbon monoxide, and hydrogen is at reaction temperature before butadiene is introduced.

The catalysts employed in the process of this invention includes the hydrogenation catalysts generally. It is preferred, however, to use hydrogenation catalysts of cobalt, nickel, and metals of group II of the periodic table having an atomic number of 12–30, i. e., zinc, magnesium, and calcium. Still more preferred are cobalt catalysts because of their low-temperature operation. Examples of suitable catalysts are cobalt, cobalt sulfide, cobalt carbonyl, butadiene-cobalt carbonyl complex, calcium metal, magnesium metal, zinc metal, and the like. The amount of catalyst may vary from 1–50% of the weight of the butadiene, depending on the particular catalyst employed. Preferably, the amount is from 5–30% of the diene, the higher percentage amounts being more suitable with the group II metal catalysts described above.

The relative proportions of carbon monoxide to hydrogen which can be employed in the process of this invention may vary widely from those given in the illustrative examples. Suitable molar ratios of carbon monoxide to hydrogen are from 1:3 to 3:1, although it is usually preferred, though not essential, to employ an excess of hydrogen. The introduction of butadiene should be maintained at such a rate that the molar ratio of butadiene to unreacted hydrogen does not exceed 1:2.

The process of this invention can be carried out as a batch operation, as illustrated by the examples, or as a semi-continuous or continuous liquid or vapor-phase operation.

Although the use of a solvent is not essential, increased yields and other advantages are derived under certain conditions by the use of suitable solvents; e. g., oxygenated solvents, including water; carboxylic acids and anhydrides, e. g., acetic acid, acetic anhydride, etc.; alcohols, e. g., tertiary butanol; ethers, e. g., diethyl ether and dioxane; and hydrocarbon solvents, e. g., cyclohexane. It is, in general, preferable to use the oxygenated solvents.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of 5-carbon saturated acyclic aldehydes which comprises heating a mixture consisting essentially of a cobalt hydrogenation catalyst, from 1 to 9 molar equivalents of carbon monoxide, and 3 molar equivalents of hydrogen to a temperature of 75–200° C. at a pressure of 500–1500 atmospheres and thereafter injecting butadiene into the heated mixture, the molar ratio of butadiene to unreacted hydrogen being maintained below 1:2.

2. A process for the preparation of 5-carbon saturated acyclic aldehydes which comprises heating a mixture consisting essentially of an inert solvent, a cobalt hydrogenation catalyst, from 1 to 9 molar equivalents of carbon monoxide, and 3 molar equivalents of hydrogen to a temperature of 75–200° C. at a pressure of 500–1500 atmospheres and thereafter injecting butadiene into the heated mixture, the molar ratio of butadiene to unreacted hydrogen being maintained below 1:2.

RICHARD ENSIGN BROOKS.

REFERENCES CITED

The following references are of record in the file of this patent:

UNITED STATES PATENTS

| Number | Name | Date |
| --- | --- | --- |
| 2,437,600 | Gresham et al. | Mar. 9, 1948 |